| United States Patent [19] | [11] 3,875,270 |
| --- | --- |
| Haefner et al. | [45] Apr. 1, 1975 |

[54] PROCESS OF PREPARING BATTERY SEPARATORS

[75] Inventors: Albert J. Haefner; Joseph B. Glass; William E. Burt, all of Baton Rouge, La.

[73] Assignee: Ethyl Corp., Richmond, Va.

[22] Filed: July 1, 1974

[21] Appl. No.: 484,398

Related U.S. Application Data

[63] Continuation-in-part of Ser. No. 373,178, June 25, 1973, abandoned, which is a continuation of Ser. No. 856,840, Sept. 10, 1969, abandoned.

[52] U.S. Cl.................... 264/6, 136/146, 161/159, 161/168, 260/2.5 M, 260/2.5 H, 260/2.5 HA, 260/2.5 HB, 260/34.2, 260/42, 260/42.25, 260/42.49, 260/42.55, 264/13
[51] Int. Cl............................................. B29d 27/00
[58] Field of Search...... 264/6, 13; 260/2.5 M, 34.2, 260/42; 136/146

[56] References Cited
UNITED STATES PATENTS

| | | | |
| --- | --- | --- | --- |
| 2,460,546 | 2/1949 | Stephanoff | 260/95 |
| 2,564,397 | 8/1951 | Duddy | 260/17.4 R |
| 3,092,438 | 6/1963 | Kruger | 260/42 |
| 3,194,781 | 7/1965 | Hedberg et al. | 260/33.6 |
| 3,326,848 | 6/1967 | Clemens et al. | 260/42 |

OTHER PUBLICATIONS

Kaufman M., Advances In PVC Compounding And Processing, Maclaven & Sons Ltd., London, 1962, page 57.

*Primary Examiner*—James H. Derrington
*Attorney, Agent, or Firm*—Donald L. Johnson; John F. Sieberth; David L. Ray

[57] ABSTRACT

An inert filler is mixed with a thermoplastic resin emulsion prior to spray drying the emulsion. The resultant resin powder is sintered to form high strength microporous diaphragms.

9 Claims, No Drawings

PROCESS OF PREPARING BATTERY SEPARATORS

CROSS REFERENCE TO RELATED APPLICATION

This application is a continuation-in-part of application Ser. No. 373,178, filed June 25, 1973, now abandoned, which is a continuation of application Ser. No. 856,840, filed Sept. 10, 1969, now abandoned.

BACKGROUND OF THE INVENTION

This invention relates to the spray drying of resin emulsions containing an inert filler, and to products obtained thereby. In particular, the present invention is related to the production of a composition suitable for making sintered, microporous diaphragms. More particularly, the present invention is related to microporous diaphragms suitable for use as battery separators.

Battery separators are used to separate the positive and negative plates of an electric storage battery. A useful assessment of the suitability of a separator of any particular type can be derived from the examination of the properties of physical strength, permeability, volume porosity, pore size, electrical resistance, and chemical resistance to acid. Physical strength is especially important since battery separators must resist the stresses and strains to which they are subjected during manufacture, assembly and shipping, and in use.

Battery separators sintered from mixtures of powdered resins and inert, porous fillers such as diatomaceous earth are well known in the prior art (see U.S. Pat. Nos. 2,564,397 and 3,092,438). The prior art separators are generally produced by mechanically mixing a filler with dried particles of a thermoplastic resin binder and then sintering the mixture to form a separator.

A major disadvantage of the prior art separators is that their physical strength is undesirably low. Many of the prior art separators chip and break easily, and their tensile strength is quite low.

The advantages of the present invention over the prior art are several.

First, battery separators produced from the powdered resin of the present invention have greatly increased physical strength.

Second, battery separators produced from the powdered resin of the present invention have highly desirable volume porosity, pore size, electrical resistance, and permeability.

Third, the process of the present invention is simple and economical.

It is an object of the present invention to provide a method for the preparation of a spray dried resin powder containing an inert filler.

It is another object of the present invention to provide a spray dried resin powder particularly suitable for making sintered, microporous diaphragms.

It is still another object of the present invention to provide a sintered battery separator of greatly increased strength.

THE INVENTION

The foregoing and additional objects are realized in a process and product produced thereby wherein an inert, porous filler is mixed with a thermoplastic resin emulsion, and the mixture of the resin emulsion and filler is spray dried. An additional object of the present invention is realized in a sintered battery separator of improved strength prepared from a powdered resin produced by adding a filler to the thermoplastic, acid-resistant resin emulsion, and spray drying the mixture of the resin emulsion and filler.

In the development of the present invention, it was discovered that diaphragms sintered from thermoplastic resins which had been spray dried after having a filler added thereto were much stronger than diaphragms sintered from resins to which a filler had been added after the resin was dried. Many different thermoplastic resins were spray dried after mixing, and all were found to greatly increase the strength or diaphragms sintered therefrom.

Any emulsifiable thermoplastic resin can be used in effectively carrying out the process of the present invention. The emulsifiable, thermoplastic resins include polymers and copolymers of the fluorocarbons, vinyl halides, vinylidene halides, vinyl acetate and its derivatives, styrenes, acrylics, coumaroneindene, vinyl ethers, vinyl ketones, ethylene, and mixtures thereof. U.S. Pat. Nos. 2,592,526; 2,508,341 and 2,715,115 disclose typical thermoplastic resins which may be used in carrying out the process of the present invention, which are hereby incorporated by reference.

Exemplary of the fillers which may be used in the present invention are diatomaceous earth, cellulose, vermiculite, barytes, silica gel, bentonite, quartz, powdered glass, china clay, carbon black, coal dust, asbestos, and the like. The filler may contain particles which range in size from 150 to 2 microns. A preferred range is 100 to 5 microns. A particularly preferred range is 75 to 5 microns.

A preferred particle size distribution by weight of filler is for about 0.5 percent of the particles to be between 60 and 44 microns, about 54.5 percent to be between 44 and 10 microns, with about 45 percent between 10 and 2 microns. A particularly preferred particle size distribution by weight of particles is for about 30 percent of the particles to be between 75 and 45 microns in diameter, and for about 70 percent of the particles to be between 45 and 5 microns in diameter.

The percentage of filler by total weight of solids in emulsion may suitably range from about 10 to about 40 percent. A preferred range is from about 15 to about 30 perecent. A particularly preferred range is from about 25 to about 30 percent.

Particularly preferred as a filler is Johns-Manville "Celite 545," a diatomaceous earth filler having a particle size distribution by weight of approximately 6 percent about 150 microns, with about 11 percent of the particles being between 150 and 75 microns in size, about 23 percent lying between 75 and 45 microns, and about 60 percent of the particles being between 45 and 5 microns.

Emulsions of resins for spray drying in accordance with the process of the present invention can be prepared in any conventional manner well known in the prior art, such as taught in U.S. Pat. Nos. 2,843,576; 2,592,526 and British Pat. No. 978,875, for example. The percentage by weight of solids in emulsion may generally range from about 10 to about 60 percent, with a preferred range being 40 to 50 percent. Latex particle size may range between 0.01 and 2.0 microns, with a preferred range of 0.18 to 0.83 microns. Any conventional emulsifier may be used, such as sodium lauryl sulfate, sodium dodecyl benzene sulfonate, sodium tridecyl sulfate, and the like. Examples of the preparation and spray drying of typical resin emulsions are as follows.

EXAMPLE I

Thirty-seven pounds of vinyl chloride, 1065 grams of an aqueous seed latex of polyvinyl chloride, 0.035 percent of $[NH_4]_2S_2O_8$, based on the weight of the vinyl chloride monomer, were mixed with 55 lbs. of water. The emulsion was placed in a 15-gal. autoclave and heated to a temperature of 120° F. while being agitated at 50 rpm. 120 milliliters of an aqueous solution of 0.002 percent sodium sulfite, based on the weight of the vinyl chloride monomer was added to the reaction mixture during polymerization at a constant rate over a period of one hour starting 45 minutes after the reaction mixture reached 120° F. In addition, a solution of 0.85 percent, based on the weight of the vinyl chloride monomer, of sodium tridecyl sulfate dissolved in 1,200 milliliters of water was added continuously to the reaction mixture over a 4 hour period beginning 30 minutes after the reaction mixture had reached 120° F. The temperature was maintained at 120° F. and agitation continued until approximately 95 percent of the vinyl chloride was converted to polymer. The resultant latex had a particle size range of 0.18–0.83 microns. Approximately 10 percent, based on the weight of the emulsion, of a typical commercially available barium sulfate filler known as Thompson and Weinman Corp. "Barytes 22" was added. "Barytes 22" has a maximum particle size of 60 microns, with 99.5 percent of the particles being smaller than 44 microns and 45 percent of the particles being smaller than 10 microns. The resultant emulsion was placed in a conventional mixer and agitated for 20 minutes at 70 rpm by a six-bladed turbine agitator 2 inches in diameter. The slurry was then transferred to a conventional spray dryer. The dryer was a "Nerco-Niro Portable Spray Dryer" made by Nichols Engineering and Research Corporation. An atomizer wheel of approximately 2 inches in diameter was employed. Air flow was approximately 50 cubic feet per minute at a velocity of 2,300 feet per minute. The atomizer wheel speed of the dryer was maintained at approximately 25,000 rpm throughout the drying. The inlet temperature of the dryer was maintained at approximately 370° F., and the outlet temperature was maintained at approximately 170° F. Agitation was continuous during the drying step to prevent settling in the feed tank of the dryer. Bulk density of the resulting inert filled PVC resin powder was 0.56 grams per cubic centimeter.

Similar powdered resins can be prepared by repeating the procedure of Example I with the exception that the following are substituted for vinyl chloride: vinyl fluoride, vinyl bromide, vinylidene chloride, vinylidene fluoride, and vinylidene bromide.

EXAMPLE II

The same procedure as Example I was followed except that "Barytes 22" was replaced with Johns-Manville Corp. "Celite 545" which had been sifted through a 200 mesh screen to limit the maximum particle size to about 74 microns and change the particle size distribution so that approximately 29 percent by weight of the particles were between 74 and 44 microns in size, and 71 percent by weight of the particles were between 44 and 5 microns in size. The bulk density of the resultant spray dried inert filled resin powder was .48 grams per cubic centimeter.

The spray dried powder produced in Example I was poured onto a 16-gauge aluminum plate approximately 6½ inches wide by 18 inches long. A spreader was drawn across the powder to shape the powder into the desired profile. The spreader was a metal straightedge with a rectangular portion removed from the edge thereof. The cross-section of the powdered resin could thus be formed to have the same dimensions as the rectangular portion of the spreader. The aluminum plate and powdered resin were heated in a circulating hot air oven at 210° C for approximately 5½ to 7 minutes. The resultant diaphragm was flat and contained no ribs. The same procedure was repeated for the powder prepared in Example II.

The two diaphragms prepared from the powder produced in Examples I and II were tested and results recorded in Table I under the headings "Sample A" and "Sample C," respectively. In addition, two other samples, labeled "B" and "D" were tested. Samples B and D were sintered from the same resins prepared in Examples I and II, respectively, except that the filler was not mixed with the resin until after the resin had been spray dried. Samples A and C were labeled "Spray Dried" to indicate that the filler was added to the emulsion prior to spray drying, and Samples B and D were labeled "Mixed" to indicate that the filler was not added to the resin until after the resin was spray dried. In addition, the type of filler used in each sample was listed in the column head for each sample tested.

As seen in Table I, the volume porosity, pore size, electrical resistance, and permeability are approximately the same for the "Spray Dried" resin and for the "Mixed" resin. However, the physical strength properties labeled "Tensile Strength," "Edge Chip Strength," and "Bend Strength" are far superior for the spray dried resins.

The volume porosity of a diaphragm is the percentage by volume of interconnecting pores. High volume porosity is important in battery separators because the electrolyte is a component of the cell reaction, and in a compact design, it is desirable to have the separator displace a minimum quantity of electrolyte. Volume porosity was measured by weighing a diaphragm before and after soaking in n-propanol. The volume of n-propanol absorbed can be determined by subtracting the weight of the diaphragm prior to soaking from the weight of the diaphragm subsequent to soaking and multiplying the remainder by the specific density of n-propanol. The volume of n-propanol absorbed is taken as the volume of the pores. The volume of the diaphragm is determined by measuring the length, width, and height, and calculating the product thereof. A suitable volume porosity range is 30–70 percent. A more preferred range is 50–55 percent. "Celite 545" is particularly preferred because the volume porosities of diaphragms in which it was used were very high, as can be seen in Column D of Table I.

TABLE I

| | SAMPLE A | SAMPLE B | SAMPLE C | SAMPLE D |
|---|---|---|---|---|
| | "Barytes 22" (Spray Dried) | "Barytes 22" (Mixed) | "Celite 545" (Spray Dried) | "Celite 545" (Mixed) |
| Volume Porosity (%) | 43.2 | 46.5 | 51.8 | 66.5 |
| Pore Size | | | | |
| Max. (Microns) | 28.2 | 38.6 | 29.0 | 31.6 |
| Avg. (Microns) | 22.9 | 27.0 | 25.1 | 26.0 |
| Resistance (OHM/in.$^2$) | 0.023 | 0.023 | 0.026 | 0.012 |
| Permeability (Sec./300 Ml. Air) | 21–32 | 20–21 | 16–19 | 14–19 |
| Tensile Strength (psi) | 580 | 260 | 230 | 90 |
| Edge Chip Strength (Range in inches) | 4 – 4¼ | 2 – 2½ | 2¼ – 2½ | ¾ – 1¼ |
| Bend Strength | | | | |
| Failure Angle (degrees) | 62 | 38 | 41 | 30 |
| Failure Load (in.-lbs.) | .080 | .047 | .041 | .015 |

Note: All samples were .021 inches thick.

The pore size cannot be measured exactly since the size of the pores vary among themselves in size, shape, and in disposition to the external surface. However, an average size has been determined by the following procedure. A 1-inch diameter circular portion of a diaphragm is soaked in carbon tetrachloride and mounted horizontally over the open end of a cylinder. The edges of the sample are sealed over the end of the cylinder so that no air may escape from the cylinder without passing through the diaphragm. The top of the diaphragm is covered with a layer of carbon tetrachloride. The air pressure inside the diaphragm is slowly increased and the pressure at which the air first bubbles through the diaphragm is recorded. The pressure is further increased until bubbling is noted over the entire area of the test sample. These pressure measurements correspond to the maximum and average pore sizes, respectively, which are calculated from the formula $D = 1061/P$ where $D$ = pore size in microns and $P$ = pressure in centimeters of water. Ideally, pore size should be as small as possible to reduce the probability of active material being forced or going through the separator. However, reducing the pore size also decreases the permeability, and suitable compromise must be made. A suitable range is 20–40 microns. A more preferred range is 20–26 microns.

Low electrical resistance is a fundamental requirement of a battery separator. A typical suitable range is 0.025 to 0.075 ohms/in.$^2$. A particularly preferred range is 0.20 to .035 ohms/in.$^2$. Electrical resistance was tested in a bath of sulfuric acid. The acid was contained in a hard rubber case or tube in the general form of a rectangular prism approximately 9¾ inches long, 8 inches deep, and 6¼ inches wide. Two rectangular glass baffles approximately 9¾ inches long and 8 inches wide were located approximately in the center of the case, perpendicular to the ends of the case and parallel to the opposing rectangular sides of the case. Two baffles were spaced approximately ¾ of an inch apart. A circular hole 2½ inches in diameter was located in the center of the baffles to provide the only electrical current path through the baffles. Graphite electrodes were located inside the case on both sides of the set of baffles and were connected to a 110 volt, 60 cycle voltage supply. The bath was filled with an aqueous solution of $H_2SO_4$ having a specific gravity of 1.280 at 72° F. Measurements were taken of the resistance to the flow of current between the graphite electrodes with, and without, ten diaphragms placed between the glass baffles. The smaller measurement was then subtracted from the larger, and the remainder divided by ten. The dividend represented the total resistance of one diaphragm over the 4.9 square inches of area exposed to conduction by the 2.5 inch diameter hole in the glass baffles. The total resistance was multiplied by 4.9 to obtain the resistance per square inch as recorded in Table I.

Permeability is important because electrolyte must be able to flow through the diaphragm to replace depleted electrolyte in the area of the electrodes. Air permeability was tested by means of a Gurley Densometer, Model 4110. This instrument determines the porosity or air resistance of the separator by measuring the time required for a given volume of air under a given pressure to pass through a standard area. The permeabilities recorded in Table I were measured in seconds required for 300 milliliters of air to pass through an area of 0.25 square inches. The air was forced through the diaphragm by a 5-ounce weight sliding downward in a vertical, calibrated tube 0.25 square inches in cross-sectional area. A suitable permeability range is 12–50 seconds. A more preferred range is 15–30 seconds.

Tensile strength was determined by applying increasing tensile forces to a diaphragm until the diaphragm was disjoined, and recording the maximum force applied. To calculate tensile strength, the force recorded was divided by the cross-sectional area of the sample tested. The instrument used in determining the tensile strength was a "Universal Tester," Model TT-C produced by the Instron Engineering Corporation.

The chip strength was detemined by dropping a 20-gram cylinder onto the edge of the separator. The cylinder was 1-inch in diameter and sharpened to a "V" wedge at the end striking the diaphragm. It was allowed to drop inside another cylinder slightly larger in diameter for guidance. The sample separator was disposed on edge beneath this guiding tube and stretched between two clamps. The test comprised dropping the cylinder from increasing heights until a chip in the edge of the separator of at least ⅛ inch depth was observed. The height required to produce the ⅛ inch chip was then recorded.

The bend strength tests were run on a Tinius Olsen Stiffness Tester to determine the angle of bend which a test strip will withstand before breaking, and the torque required to produce breakage. The thickness of the sample, the angle to which the sample was bent before breaking, and the torque required to bend the sample in inch pounds were recorded for each separator tested.

As can be seen in Table I, all of the properties relating to physical strength are much higher in the spray dried sample than in the mixed sample. The tensile strength of the spray dried sample is greater than twice the tensile strength of the mixed sample. The edge chip strength is also approximately twice as great for the spray dried sample as the mixed sample. In addition, the torque required to break the spray dried separator is approximately twice as great as the torque required to break the mixed sample.

Exemplary of the flurocarbon monomers which may be employed in practicing the embodiments of this invention are: fluoroethylene-hexafluoropropylene mixtures, trifluoroethylene, and chlorotrifluoroethylene.

The vinyl halide monomers which may be employed in the present invention are exemplified by: vinyl chloride, vinyl bromide, and vinyl fluoride. A particularly preferred embodiment of the present invention employs vinyl chloride as the sole monomer used to prepare the resin emulsion. Diaphragms sintered from such spray dried resins were found to be extremely strong and acid resistant.

Exemplary of the vinylidene halide monomers which can be used in the present invention are: vinylidene fluoride, vinylidene chloride, and vinylidene bromide.

The styrene monomers (i.e., vinyl sromatic compounds) which may be employed in the preferred embodiments of this invention include amino styrene, 4-benzyl styrene, 2-bromo styrene, 3-bromo styrene, 4-bromo styrene, 2-bromo-4-trifluoromethyl styrene, 3-sec-butyl styrene, 3-tert-butyl styrene, 4-tert-butyl styrene, 3-carbomethoxy styrene, 3-carboxy styrene, 2-chloro styrene, 3-chloro styrene, 4-chloro styrene, 4-cyano styrene, 4-cyclohexyl styrene, 2,3-dichloro styrene, 2,4-dichloro styrene, 2,5-dichloro styrene, 2,6-dichloro styrene, 3,4-dichloro styrene, 3,5-dichloro styrene, 3,4-dimethoxy styrene, 2,4-dimethyl styrene, 2,5-dimethyl styrene, 3,4-dimethyl styrene, 3,5-dimethyl styrene, 4-N,N-dimethylamino styrene, 4-N,N-dimethylsulfonamido styrene, 4-ethyl styrene, 2-fluoro styrene, 3-fluoro styrene, 4-fluoro styrene, 3-fluoro-4-trifluoromethyl styrene, 2-methoxy styrene, 3-methoxy styrene, 4-methoxy styrene, 3-methyl styrene, 3-methyl-4-methoxy styrene, 3-methyl-6-methoxy-styrene, 4-methyl styrene, 2-methyl-4-methoxy-5-isopropyl styrene, and the like.

Alpha-substituted styrene monomers such as the following may be used in lieu of the styrene monomers named hereinbefore: alpha-chloro styrene, alpha-cyano styrene, alpha-methyl styrene, alpha-methyl-4-bromo styrene, alpha-methyl-3-chloro styrene, alpha-methyl-4-chloro styrene, alpha-methyl-3,5-dibromo styrene, alpha-methyl-4-ethoxy styrene, alpha-methyl-2-fluoro styrene, alpha-methyl-4-methoxy styrene, alpha-methyl methyl styrene, alpha-methyl pentachloro styrene, alpha-methyl tetrachloro styrene, alpha-methyl trichloro styrene, alpha-methyl-3-trifluoromethyl styrene, and the like.

Typical of the acrylics that may be used in the present invention are: methylmethacrylate, methylacrylate, ethylacrylate, acrylonitrile, and the like.

Exemplary of vinyl acetate and its derivatives are the vinyl acetals and vinyl alcohol. Particularly preferred among the vinyl acetals are: vinyl propional, vinyl butyral, vinyl pentanoal, vinyl hexanoal, vinyl heptanoal, vinyl octanoal, vinyl nonanoal, vinyl decanoal, vinyl undecanoal, vinyl dodecanoal, and the like.

Representative of the vinyl ethers which may be used in the present invention are: vinyl methyl ether, vinyl ethyl ether, vinyl-n-propyl ether, vinyl isopropyl ether, vinyl butyl ether, vinyl-sec-butyl ether, vinyl isobutyl ether, vinyl-tert-butyl ether, vinyl-n-pentyl ether, vinyl isopentyl ether, vinyl-n-hexyl ether, vinyl isohexyl ether, vinyl-n-heptyl ether, vinyl isoheptyl ether, vinyl-n-octyl ether, vinyl isoctyl ether, vinyl-n-nonanoal ether, vinyl phenyl ether, vinyl-p-tolyl ether, vinyl-m-tolyl ether, vinyl-o-tolyl ether, vinyl benzyl ether, vinyl-p-nitrophenyl ether, vinyl-m-nitrophenyl ether, vinyl-o-nitrophenyl ether, vinyl cresol ether, vinyl isoamyl ether, and the like.

Exemplary of the polyvinyl ketones which may be used in the present invention are: vinyl methyl ketone, vinyl ethyl ketone, vinyl-n-propyl ketone, vinyl isopropyl ketone, vinyl butyl ketone, vinyl-n-butyl ketone, vinyl-sec-butyl ketone, vinyl-tert-butyl ketone, vinyl isobutyl ketone, vinyl-n-pentyl ketone, vinyl isopentyl ketone, vinyl-m-hexyl ketone, vinyl-n-heptyl ketone, vinyl-n-octyl ketone, vinyl-n-nonanol ketone, vinyl-n-decyl ketone, vinyl benzyl ketone, vinyl phenyl ketone, vinyl-m-tolyl ketone, vinyl-o-tolyl ketone, vinyl-p-tolyl ketone, vinyl isoamyl ketone, vinyl naphthyl ketone, vinyl chloromethyl ketone, and the like.

The diaphragms sintered from resins spray dried in accordance with the present invention have been found to have far superior physical strength qualities. In addition, the permeability, volume porosity, pore size, electrical resistance, and chemical resistance to acid of spray dried diaphragms surpass or equal the same properties of separators made from resins which are not spray dried.

Microporous diaphragms prepared in accordance with the present invention have wide ranging utility in addition to their use as battery separators. They can be used for liquid filtration, gas filtration, fluidization of powders, pneumatic silencing, and in making humidifiers.

While there has been described what are at present considered the preferred embodiments of the present invention, it will be apprent to those skilled in the art that various modifications and changes may be made without departing from the spirit and scope of the invention.

What is claimed is:

1. A process for making a battery separator, said process comprising:
   a. polymerizing an aqueous emulsion of vinyl chloride to produce an aqueous resin emulsion,
      i. said resin emulsion containing latex particles ranging in diameter from about 0.01 to 2.0 microns, and
      ii. solids in an amount equal to about 10 to 60 percent, based on the total weight of solids in the emulsion;
   b. mixing a diatomaceous earth filler comprising particles ranging in size from about 150 to about 2 microns with said resin emulsion prior to spray drying said resin emulsion wherein said filler comprises from about 10 to about 40 percent by weight of the total weight of solids in said resin emulsion including said filler.

c. spray drying said mixture of resin emulsion and filler; and d. shaping said mixture of resin emulsion and filler into a sheet profile and sintering said profile to produce a rigid sheet having a volume porosity of from about 30 to about 70 percent and a pore size of from about 20 to about 40 microns.

2. The process of claim 1 wherein said volume porosity ranges from about 50 to about 55 percent.

3. The process of claim 1 wherein said pore size ranges from about 20 to about 26 microns.

4. The process of claim 1 wherein said particles in said resin emulsion range in diameter from about 0.18 to about 0.83 microns.

5. The process of claim 1 wherein said filler comprises from about 15 to about 30 percent by weight of the total weight of solids in said resin emulsion including said filler.

6. The process of claim 1 wherein said filler comprises particles ranging in size from about 100 to about 5 microns.

7. The process of claim 1 wherein said filler comprises particles ranging in size from about 75 to about 5 microns.

8. The process of claim 1 wherein said filler has a particle size distribution by weight of approximately 0.5 percent of the particles between 60 and 44 microns, about 54.5 percent of the particles between about 44 and about 10 microns, and about 45 percent of the particles between about 10 and about 2 microns.

9. The process of claim 1 wherein said filler has a particle size distribution by weight of approximately 6 percent above 150 microns, about 11 percent between 150 and 75 microns, about 23 percent between about 75 and 45 microns, and about 60 percent between 45 and 5 microns.

* * * * *